US010547855B2

(12) United States Patent
Serre et al.

(10) Patent No.: US 10,547,855 B2
(45) Date of Patent: Jan. 28, 2020

(54) METHOD FOR ENCODING/DECODING A PICTURE BLOCK

(71) Applicant: INTERDIGITAL VC HOLDINGS, INC., Wilmington, DE (US)

(72) Inventors: Catherine Serre, Saint Gregoire (FR); Sebastien Lasserre, Thorigne Fouillard (FR); Fabrice Le Leannec, Mouaze (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 727 days.

(21) Appl. No.: 15/157,342

(22) Filed: May 17, 2016

(65) Prior Publication Data

US 2016/0345015 A1 Nov. 24, 2016

(30) Foreign Application Priority Data

May 18, 2015 (EP) .................................... 15305737

(51) Int. Cl.
*H04N 19/186* (2014.01)
*H04N 19/176* (2014.01)
*H04N 19/182* (2014.01)

(52) U.S. Cl.
CPC ......... *H04N 19/186* (2014.11); *H04N 19/176* (2014.11); *H04N 19/182* (2014.11)

(58) Field of Classification Search
CPC .. H04N 19/176; H04N 19/186; H04N 19/182; H04N 19/34; H04N 19/50;

(Continued)

(56) References Cited

U.S. PATENT DOCUMENTS 6,819,713 B1 * 11/2004 Sato ...................... H04N 19/70
375/240.12
8,537,893 B2 9/2013 Efremov et al.
(Continued)

FOREIGN PATENT DOCUMENTS

JP 2009033293 A * 2/2009

OTHER PUBLICATIONS

Dolzhenko et al, "Perceptual Colour Spaces for High Dynamic Range Image Compression" Proceedings of the SPIE—The International Society for Optical Engineering | vol. 8436 | 843608 (11 pp.)SPIE—The International Society for Optical Engineering.

(Continued)

*Primary Examiner* — Sath V Perungavoor
*Assistant Examiner* — Yong Joon Kwon
(74) *Attorney, Agent, or Firm* — Brian J. Dorini; Ronald Kolczynski

(57) ABSTRACT

A method and device for encoding or decoding a picture block having a luminance component. The method includes obtaining a luminance residual block ($L_r$) by subtracting a first representation ($L_l$, $L_{lD}$) of an average value of the luminance component calculated from the luminance component, obtaining a second representation ($f(L_l)$, $f(L_l)_D$) of the average value by applying a transfer function to the average value ($L_l$) of the luminance component in order to reduce the dynamic range of the average value and encoding a luminance block ($L_e$) obtained by adding (105, 302) together the luminance residual block ($L_r$) and the second representation ($f(L_l)$, $f(L_l)_D$) of the average value.

4 Claims, 9 Drawing Sheets

(58) Field of Classification Search
CPC .......... H04N 19/61; H04N 19/98; H04N 9/65; H04N 9/66; H04N 9/77
See application file for complete search history.

(56) References Cited

U.S. PATENT DOCUMENTS

| | | | |
|---|---|---|---|
| 8,666,186 B1 | 3/2014 | Rasche | |
| 2005/0237432 A1* | 10/2005 | Yokoyama | H04N 5/20 348/678 |
| 2007/0104388 A1* | 5/2007 | Ali | G06T 5/007 382/274 |
| 2010/0177203 A1* | 7/2010 | Lin | H04N 5/23229 348/222.1 |
| 2013/0287308 A1 | 10/2013 | Salvucci | |
| 2013/0294689 A1 | 11/2013 | Jia et al. | |
| 2018/0278968 A1* | 9/2018 | Agostinelli | H04N 5/202 |

OTHER PUBLICATIONS

Le Pendu et al., "Adaptive Re-Quantization for High Dynamic Range Video Compression", 2014 IEEE International Conference on Acoustics, Speech and Signal Processing (ICASSP), Florence, Italy, May 4, 2014, pp. 7367-7371.

Segall, A., "Scalable Coding of High Dynamic Range Video", Proceedings 2007 IEEE International Conference on Image Processing, ICIP 2007, San Antonio, Texas, USA, Sep. 16, 2007, pp. 1-4.

Anonymous, "ITU-T Telecommunication Standardization Sector of ITU H.264, Series H: Audiovisual and Multimedia Systems, Infrastructure of Audiovisual Services—Coding of Moving Video, Advanced video coding for generic audiovisual services", International Telecommunication Union, Feb. 2014, pp. 1-790.

Anonymous, "ITU-T Telecommunication Standardization Sector of ITU H.265, Series H: Audiovisual and Multimedia Systems, Infrastructure of Audiovisual Services—Coding of Moving Video, High efficiency video coding", International Telecommunication Union, Oct. 2014, pp. 1-540.

Anonymous, "ITU-T Telecommunication Standardization Sector of ITU T.800, Series T: Terminals for Telematic Services, Information Technology—JPEG 2000 image coding system: Core coding system", International Telecommunication Union, Aug. 2002, pp. 1-212.

Garbas et al., "Inter-Layer Prediction for Backwards Compatible High Dynamic Range Video Coding with SVC", 2012 Picture Coding Symposium, Krakow, Poland, May 7, 2012, pp. 285-288.

Touze et al., "HDR Video coding based on local LDR quantization", HDRi2014—Second International Conference and SME Workshop on HDR Imaging, Sarajevo, Bosnia and Herzegovina, Mar. 4, 2014, pp. 1-6.

Mai et al., "Visually Favorable Tone-Mapping With High Compression Performance in Bit-Depth Scalable Video Coding", IEEE Transactions on Multimedia, vol. 15, No. 7, Nov. 2013, pp. 1503-1518.

Firas et al., "High throughput JPEG2000 compatible encoder for high dynamic range images", 15th IEEE International Conference on Image Processing (ICIP 2008), San Diego, California, USA, Oct. 12, 2008, pp. 1424-1427.

* cited by examiner

METHOD FOR ENCODING/DECODING A PICTURE BLOCK

This application claims the benefit, under 35 U.S.C. § 119 of European Patent Application No. 15305737.7, filed May 18, 2015.

FIELD

The present disclosure generally relates to picture/video encoding and decoding. Particularly, but not exclusively, the technical field of the present disclosure is related to encoding/decoding of a picture whose pixels values belong to a high-dynamic range.

BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of n values, where n is the number of components. Each value of a vector is expressed in a number of bits which defines a maximal dynamic range of the pixel values.

A picture block means a set of pixels which belong to this picture and the pixel values of a block mean the values of the pixels which belong to this block. A picture block may be a macroblock, a Coding Unit or a Transforming Unit according to H264 or H265, or any other set of pixels forming a region of picture of any arbitrary shape (not limited to a square or rectangular shape).

Low-Dynamic-Range pictures (LDR pictures) are pictures whose luminance values are expressed in a limited number of bits (most often 8 or 10). This limited expression does not allow correct rendering of small signal variations, in particular in dark and bright luminance ranges. In high-dynamic range images (HDR images), the signal expression is extended in order to maintain a high accuracy of the signal over its entire range. In HDR images, pixel values are usually expressed in floating-point format (either 32-bit or 16-bit for each component, namely float or half-float), the most popular format being openEXR half-float format (16-bit per RGB component, i.e. 48 bits per pixel) or in integers with a long expression, typically at least 16 bits.

A typical approach for encoding an HDR image is to apply a transfer function to the picture in order to reduce the dynamic range of the picture (typically 8 bits). Then, the transferred picture is encoded by means of a traditional encoding scheme (JPEG/JPEG200, JPEG2000: "Information technology—JPEG2000 image coding system: Code coding system", ITU-T Recommendation T.800, August 2002, or MPEG-2, H.264/AVC, H.264/AVC: "Advanced video coding for generic audiovisual services", Recommendation ITU-T H.264 (Edition 9), February 2014 or H265/HEVC, HEVC: "High Efficiency video coding", Recommendation ITU-T H.265, October 2014 for video.

A typical transfer function is defined in a contribution to the ITU standard organization entitled "Image dynamic range in television systems", document 6C/77-E, 4 Oct. 2012".

At the decoder side, a transferred picture is obtained and an inverse transfer function is applied on the decoded transferred picture. The term "inverse transfer function" means that if a transfer function and an inverse transfer function are applied successively to an input picture (without any encoding/decoding), the resulting picture and the input picture are the same picture. Any monotone function may be a transfer function.

Using such a typical encoding scheme for encoding an HDR picture involves large sizes of the compressed pictures. Consequently, such typical approaches cannot be used in applications requiring high coding performances such, for example, in a transmission context where high compression rates are required.

The present disclosure has been devised with the foregoing in mind.

SUMMARY

In light of the foregoing, aspects of the present disclosure are directed to creating and maintaining semantic relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for encoding a picture block having a luminance component. The method comprises:

obtaining a luminance residual block by subtracting a first representation of an average value of the luminance component from said luminance component;

obtaining a second representation of the average value by applying a transfer function to the average value ($L_l$) of the luminance component in order to reduce the dynamic range of the average value;

encoding a luminance block obtained by adding together the luminance residual block and the second representation of the average value.

In accordance with present principles, obtaining the second representation of the average value further comprises quantizing the transferred average value according to a sampling factor, and the first representation of the average value is obtained by applying another transfer function to said second representation of the average value, said another transfer function is an inverse of the transfer function.

In accordance with present principles, the method further comprises encoding a residual average value obtained by subtracting an average value of a decoded version of the encoded luminance block from said first representation of the average value.

In accordance with present principles, the picture block further comprises at least one color component, wherein the luminance residual block ($L_r$) belong to a perceptual space having a metric whose values are representative of the differences between the visual perceptions of two points of said perceptual space, the metric being defined such that a perceptual threshold exists below which a human being is not able to perceive a visual difference between two colours of the perceptual space; and enabling a control of the visual losses in a displayed decoded version of the picture block to be encoded.

In accordance with present principles, the present disclosure relates to a method for decoding a picture block having a luminance component expressed in an original number of bits. The method comprises:
- obtaining a luminance residual block by subtracting an average value of a luminance block from said luminance block;
- obtaining a decoded luminance component of the picture block by adding together the luminance residual block and a representation, expressed in the original number of bits, of the average value of the luminance block.

In accordance with present principles, the representation of the average value of the luminance block is obtained by adding together a residual average value and an average value of the luminance block.

In accordance with present principles, the picture block comprises at least one color component, wherein the method further comprises applying an inverse transform to the luminance residual block, said luminance residual block belonging to a perceptual space having a metric whose values are representative of the differences between the visual perceptions of two points of said perceptual space, the metric being defined such that a perceptual threshold exists below which a human being is not able to perceive a visual difference between two colors of the perceptual space, and enabling a control of the visual losses in a displayed decoded version of the picture block.

According to another of its aspects, the present disclosure relates to a signal carrying an encoded luminance block, characterized in that it further carries an information data indicating that the encoded luminance block represents the sum of the luminance component of a picture block and a representation of an average value of said luminance component.

According to other of its aspects, the disclosure relates to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the disclosure as well as other objects, advantages, features and uses of the disclosure will become evident from the following description of embodiments taken in conjunction with the accompanying drawings.

BRIEF DESCRIPTION OF DRAWINGS

In the drawings, an embodiment of the present disclosure is illustrated. It shows.

Similar or same elements are referenced with the same reference numbers.

DESCRIPTION OF EMBODIMENTS

Figure 1:
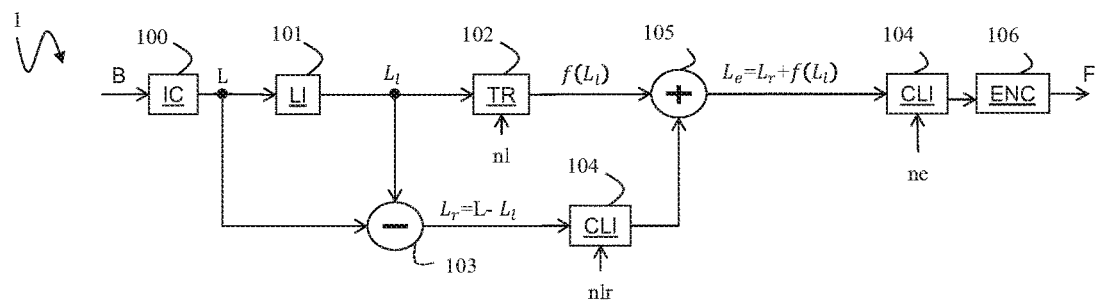
FIG. 1 shows a block diagram of the steps of a method for encoding a picture block in accordance with an embodiment of the disclosure.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding a picture block but extends to the encoding/decoding of a picture or a sequence of pictures (video) because each picture of the sequence is partitioned into multiple blocks and the blocks are sequentially encoded/decoded as described below.

An average value of a block or a component is an average value calculated from the values of the samples of this block or component.

FIG. 1 shows a block diagram 1 of the steps of a method for encoding a picture block in accordance with an embodiment of the disclosure.

In step 100, a module IC obtains a luminance component L of a picture block B to be encoded. The dynamic range of the pixel values of the luminance component L is defined on a number of bits, called the original number of bits no in the following. The picture block B may further have at least one color component C(i) with i an index which identifies a color component of the picture block B.

The disclosure is not limited either to a grey picture block (with no color component) nor to a picture block having one or more color components. When a grey level picture is encoded as described below, there is no consideration of the description referring to the color components.

In step 101, a module LI obtains an average value $L_l$ of the luminance component L.

In step 102, a module TR obtains a representation $f(L_l)$ of the average value $L_l$ expressed in a first number of bits nl, by applying a transfer function $f$ to the average value $L_l$ of the luminance component.

In step 103, a luminance residual block $L_r$ is obtained by subtracting the average value $L_l$ from the luminance component L.

According to a variant of the method, in step 104, a module CLI clips the values of the luminance residual block $L_r$ by using a second number of bits nlr.

Clipping the values of a block by using a targeted number of bits may result in, for samples lower than the minimum value allowed when representing samples' values with nlr bits nlr, setting these samples' values equal to the lower bound. Likewise, for samples higher than the maximum value allowed when representing samples values with nlr bits nlr, clipping consists in setting these samples values equal to the higher bound.

In step 105, a luminance block $L_e$ is obtained by adding together the luminance residual block $L_r$ and the representation $f(L_l)$ of the average value $L_l$.

According to an example of the method, in step 104, the module CLI clips the values of the luminance block $L_e$ by using a third number of bits ne which is defined in order that the luminance block $L_e$ be encoded (step 106) by a traditional encoder ENC such as JPEG2000, HEVC, H265, H264/AVC, . . . etc.

According to an example of the method, the values of the encoded luminance block is added to a bitstream F.

Figure 2:
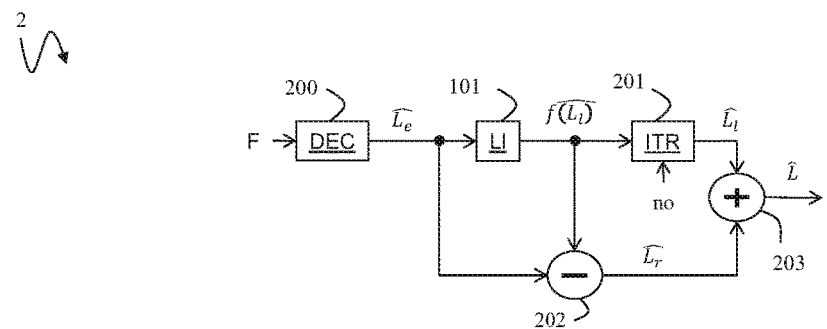
FIG. 2 shows a block diagram of the steps of a method for decoding a picture block in accordance with an example of present principles.

FIG. 2 shows a block diagram 2 of the steps of a method for decoding a picture block in accordance with an example of present principles.

This embodiment of the method for decoding allows for the decoding of a picture block encoded by a method in accordance with FIG. 1.

In step 200, a luminance block $\widehat{L_e}$ is obtained from a local or remote memory or by decoding in whole or in part a bitstream F, as illustrated in FIG. 2, by means of a decoder DEC.

In step 101, the module LI obtains a first representation $\widehat{f(L_l)}$ of an average value of the luminance block $\widehat{L_e}$.

In step 202, a luminance residual block $\widehat{L_r}$ is obtained by subtracting the first representation $\widehat{f(L_l)}$ of the average value of the luminance block $\widehat{L_e}$ from said luminance block $\widehat{L_e}$.

In step 201, a module ITR obtains a second representation $\hat{L_l}$, expressed in the original number of bits no, of the average value of the luminance block $\widehat{L_e}$, by applying an inverse transfer function $f^{-1}$ to the first representation $\widehat{f(L_l)}$.

In step 203, a decoded luminance component $\hat{L}$ of the picture block is obtained by adding together the luminance residual block $\widehat{L_r}$, and the representation $\hat{L_l}$ of the average value of the luminance block $\widehat{L_e}$.

In accordance with an example of the steps 102 and 201, a representation, expressed in an output number of bits, of an average value is obtained from the average value expressed in an input number of bits, by applying a transfer function $f$.

Thus, for example, in step 102, the representation $f(L_l)$ (expressed in the first number of bits nl) of the average value $L_l$ (expressed in the original number of bits no) is obtained by applying a transfer function in order to express such an average value $L_l$ in the first number of bits nl.

The module TR applies the transfer function $f$ and the module ITR applies the transfer function $f^{-1}$ on an input data as explained above. Note the transfer function $f^{-1}$ is the inverse of the transfer function $f$, i.e. when the transfer function $f$ "transfers" the dynamic of a data from an input number of bits to an output number of bits, the transfer function $f^{-1}$ "transfers" the dynamic of a data to said input number of bits.

For example, the transfer function is the monotonous function defined in "High Dynamic Range Electro-Optical Transfer Function of Mastering Reference Displays", SMPTE Standard, ST 2084:2014.

Figure 3:
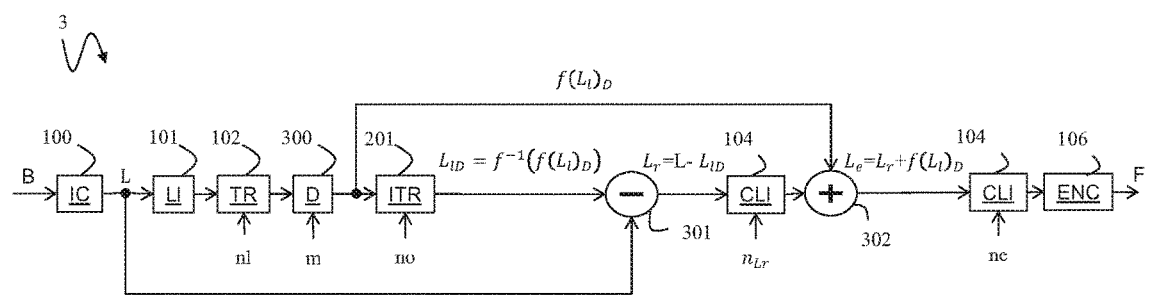
FIG. 3 shows a block diagram of the steps of a method for encoding a picture block in accordance with an example of present principles.

FIG. 3 shows a block diagram 3 of the steps of a method for encoding a picture block in accordance with an embodiment of the disclosure.

In step 100, the module IC obtains a luminance component L of the picture bock B to be encoded, in step 101, the module LI obtains an average value $L_l$ of the luminance component L, and in step 102, the module TR obtains a representation $f(L_l)$ of the average value $L_l$, called a transferred average value.

In step 300, a module D obtains a discrete average value $f(L_l)_D$ by sampling the transferred average value $f(L_l)$ based on a sampling factor m.

In accordance with an example, the average value $f(L_l)_D$ is sampled by quantizing and de-quantizing the value based on a quantizing step m.

In step 201, the module ITR obtains a first representation $L_{lD}$, expressed in the original number of bits no, of the discrete average value $f(L_l)_D$ by applying the transfer function $f^{-1}$.

In step 301, a luminance residual block $L_r$ is obtained by subtracting the representation $L_{lD}$ of the discrete average value $f(L_l)_D$ from the luminance component L.

In accordance with an example, in step 104, the module CLI clips the values of the luminance residual block $L_r$ by using the second number of bits nlr.

In step 302, a luminance block $L_e$ is obtained by adding together the luminance residual block $L_r$ and the discrete average value $f(L_l)_D$.

The luminance block $L_e$ is, potentially, clipped (step 104) and encoded (step 106).

Figure 4:
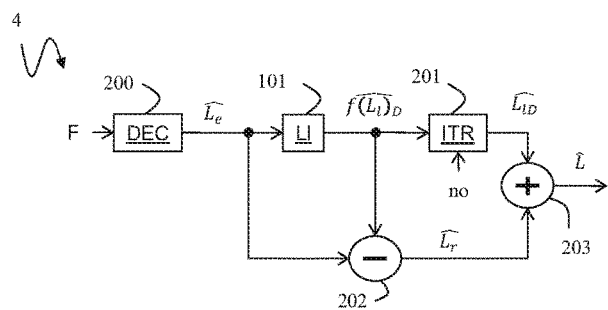
FIG. 4 shows a block diagram of the steps of a method for decoding a picture block in accordance with an example of present principles.

FIG. 4 shows a block diagram 4 of the steps of a method for decoding a picture block in accordance with an embodiment of the disclosure.

This embodiment of the method for decoding allows decoding a picture block encoded by a method in accordance with FIG. 3.

In step 200, a luminance block $\widehat{L_e}$ is obtained and, in step 101, the module LI obtains a first representation of an average value $\widehat{f(L_l)}_D$ of the luminance block $\widehat{L_e}$ as explained above.

In step 202, a luminance residual block $\widehat{L_r}$ is obtained by subtracting the first representation of the average value $\widehat{f(L_l)}_D$ of the luminance block $\widehat{L_e}$ from the luminance block $\widehat{L_e}$.

In step 201, the module ITR obtains a second representation $\widehat{L_{lD}}$, expressed in the original number of bits no, by applying the transfer function $f^{-1}$ to the first representation of the average value $\widehat{f(L_l)}_D$ of the luminance block $\widehat{L_e}$.

In step 203, a decoded luminance component $\hat{L}$ of the picture block is obtained by adding together the luminance residual block $\widehat{L_r}$ and the representation $\widehat{L_{lD}}$ of the average value of the luminance block $\widehat{L_e}$.

Figure 5:
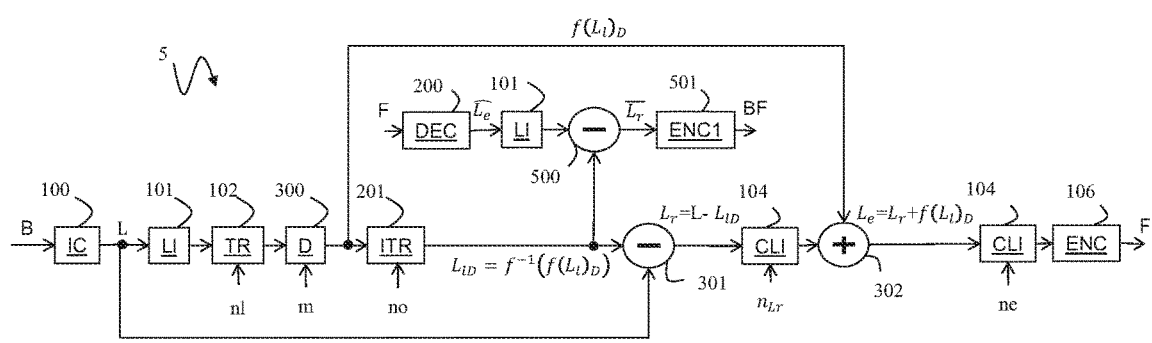
FIG. 5 shows a block diagram of the steps of a variant of the method for FIG. 3.

FIG. 5 shows a block diagram 5 of the steps of a variant of the method for FIG. 3.

In accordance with an example, a residual average value $\overline{L_r}$ of the luminance component of the picture block B is encoded.

This variant is advantageous because it ensures that the average value of the luminance block $\widehat{L_e}$ calculated at the encoder and decoder sides are the same without using a lossless encoding (ENC1).

In step 200, a luminance block $\widehat{L_e}$ is obtained and in step 101, the module LI obtains a representation $\widehat{f(L_l)}$ of an average value of the luminance block $\widehat{L_e}$ as explained above.

In step 500, the residual average value $\overline{L_r}$ is obtained by subtracting the representation $\widehat{f(L_l)}$ of the average value of the luminance block $\widehat{L_e}$ from the representation $L_{lD}$ of the discrete average value $f(L_l)_D$.

In step 501, the residual average value $\overline{L_r}$ is encoded by a traditional encoder ENC1.

In accordance with an example of the method, the residual average value $\overline{L_r}$ is added to a bitstream BF or F.

Figure 6:
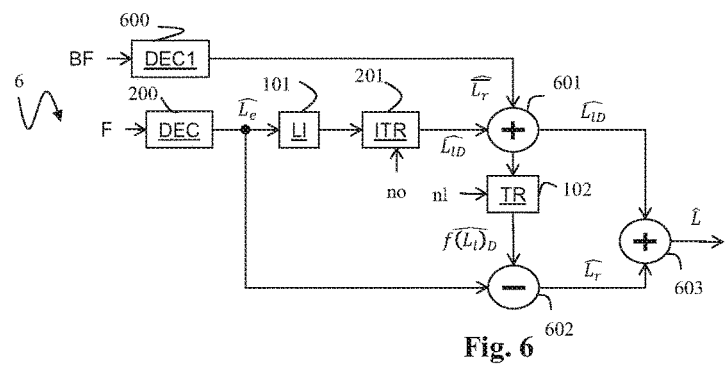
FIG. 6 shows a block diagram of the steps of a variant of the method for FIG. 4.

FIG. 6 shows a block diagram 6 of the steps of a method for decoding a picture block in accordance with an embodiment of the disclosure.

This embodiment of the method for decoding allows for the decoding of a picture block encoded by a method in accordance with FIG. 5.

In step 200, a luminance block $\widehat{L_e}$ is obtained, in step 101, the module LI obtains an average value of the luminance block $\widehat{L_e}$.

In step 201, a second representation $\widehat{L_{lD}}$ is obtained by applying the transfer function $f^{-1}$ to the first representation of the average value $\widehat{f(L_l)}_D$ of the luminance block $\widehat{L_e}$ as explained above.

In step 600, a residual average value $\widehat{\overline{L_r}}$ is obtained from a local or remote memory or by decoding at least partially a bitstream BF or F), as illustrated in FIG. 6, by means of the decoder DEC1.

In step 601, an average value $\widehat{L_{lD}}$ of the luminance block $\widehat{L_e}$ is obtained by adding together the residual average value $\widehat{\overline{L_r}}$ and the second representation $\widehat{L_{lD}}$.

In step 102, the module TR obtains a representation $\widehat{f(L_l)}_D$ of the average value $\widehat{L_{lD}}$ by applying the transfer function $f$ to the average value $\widehat{L_{lD}}$.

In step 602, a luminance residual block $\widehat{L_r}$ is obtained by subtracting the representation $\widehat{f(L_l)}_D$ of the average value of the luminance block $L_e$ from the luminance block $\widehat{L_e}$.

In step 603, a decoded luminance component of the picture block $\hat{L}$ is obtained by adding together the luminance residual block $\widehat{L_r}$ and the average value $\widehat{L_{lD}}$ of the luminance block $L_e$.

When the picture block B comprises at least one color component, the luminance block $L_e$ and each color component of the block B are encoded by using a traditional encoding.

FIGS. 7-14 show block diagrams of the steps of a variant of the methods of encoding and decoding described in relation with FIGS. 1-6 when the luminance block and the color components are transformed based on an transform T which depends on an upper bound ΔE defined in a perceptual space PS, and enabling a control of the visual losses in a displayed decoded version of the picture block to be encoded.

A perceptual space PS has a metric d((L, C1, C2), (L', C1', C2')) whose values are representative of, preferably proportional to, the differences between the visual perceptions of two points of said perceptual space.

Mathematically speaking, the metric d((L, C1, C2), (L', C1', C2')) is defined such that a perceptual threshold $\Delta E_0$ (also referred to as the JND, Just Noticeable Difference) exists below which a human being is not able to perceive a visual difference between two colors of the perceptual space, i.e.

$$d((L,C1,C2),(L',C1',C2'))<\Delta E_0, \quad (1)$$

and this perceptual threshold is independent of the two points (L, C1, C2) and (L', C1', C2') of the perceptual space.

Thus, encoding a picture block whose components belong to a perceptual space in order that the metric d of equation (1) stays below the perceptual threshold $\Delta E_0$ ensures that the displayed decoded version of the picture block is visually lossless.

In accordance with an example, the metric may be calculated on a pixel base.

It may be noted that, in practice, it is easier to control the three following inequalities individually:

$$d(L,L')<\Delta E_0^L, d(C1,C1')<\Delta E_0^{C1} \text{ and } d(C2,C2')<\Delta E_0^{C2}$$

It may be noted that, if the equation (1) is fulfilled with an upper bound greater than $\Delta E_0$, it is said, in what follows, that the encoded picture block is visually controlled, i.e. the visual losses in a displayed decoded version of this picture block are controlled.

When the picture block B comprises components belonging to a non-perceptual space such as (R,G,B) for example, a perceptual transform is applied to the picture block B in order to obtain a luminance component L and potentially two colors components C1 and C2 which belong to the perceptual space.

Such a perceptual transform is defined from the lighting conditions of the display and depends on the initial color space.

For example, assuming the initial space is the (R,G,B) color space, the picture block B is first transformed to the well-known linear space (X, Y, Z) (an inverse gamma correction may be potentially needed) and the resulting image is then transformed from reference lighting conditions of the display of a decoded version of the encoded image which are here a 3D vector of values $(X_n, Y_n, Z_n)$ in the (X,Y,Z) space.

Consequently, for example, such a perceptual transform is defined as follows when the perceptual space LabCIE1976 is selected:

$$L^* = 116 ff(Y/Y_n) - 16$$

$$a^* = 500(ff(X/X_n) - ff(Y/Y_n))$$

$$b^* = 200(ff(Y/Y_n) - ff(Z/Z_n))$$

where $ff$ is a conversion function for example given by:

$$ff(r) = r^{1/3} \quad \text{if } r > (6/29)^3$$

$$ff(r) = \frac{1}{3} * \left(\frac{29}{6}\right)^2 * r + \frac{4}{29} \quad \text{otherwise}$$

The following metric may be defined on the perceptual space LabCIE1976:

$$d((L^*,a^*,b^*),(L^{*'},a^{*'},b^{*'}))^2 = (\Delta L^*)^2 + (\Delta a^*)^2 + (\Delta b^*)^2 < (\Delta E_0)^2$$

with ΔL* being the difference between the luminance components of the two colors (L*, a*, b*) and (L*', a*', b*') and Δa* (respectively Δb*) being the difference between the colour components of these two colours.

In accordance with another example, when the perceptual space Lu*v* is selected, a perceptual transform is defined as follows:

$$u^* = 13L(u' - u'_{white}) \text{ and } v^* = 13L(v' - v'_{white})$$

where $$u' = \frac{4X}{X + 15Y + 3Z}, \quad v' = \frac{9Y}{X + 15Y + 3Z},$$

and $$u'_{white} = \frac{4X_n}{X_n + 15Y_n + 3Z_n}, \quad v'_{white} = \frac{9Y_n}{X_n + 15Y_n + 3Z_n}.$$

The following Euclidean metric may be defined on the perceptual space Lu*v*:

$$d((L^*,u^*,v^*),(L^{*'},u^{*'},v^{*'}))^2 = (\Delta L)^2 + (\Delta u^*)^2 + (\Delta v^*)^2$$

with ΔL* being the difference between the luminance components of the two colours (L*, u*, v*) and (L*', u*', v*') and Δu* (respectively Δv*) being the difference between the colour components of these two colours.

The disclosure is not limited to the perceptual space LabCIE1976 but may be extended to any type of perceptual space such as the LabCIE1994, LabCIE2000, which are the same Lab space but with a different metric to measure the perceptual distance, or any other Euclidean perceptual space for instance. Other examples are LMS spaces and IPT spaces. A condition is that the metric shall be defined on these perceptual spaces in order that the metric is preferably proportional to the perception difference; as a consequence, a homogeneous maximal perceptual threshold $\Delta E_0$ exists below which a human being is not able to perceive a visual difference between two colours of the perceptual space.

In accordance with this example, the module IC (step 100 in FIGS. 7, 10 and 12) obtains each color component of the block B to be encoded. The block B comprises thus a luminance component L and at least one color component C(i) with i an index which identifies a color component of the picture block B. The components of the picture block B belong to a perceptual space, usually a 3D space, i.e. the block B comprises a luminance component L and two color components C(1) and C(2) also referred to as C1 and C2 in what follows.

Figure 7:
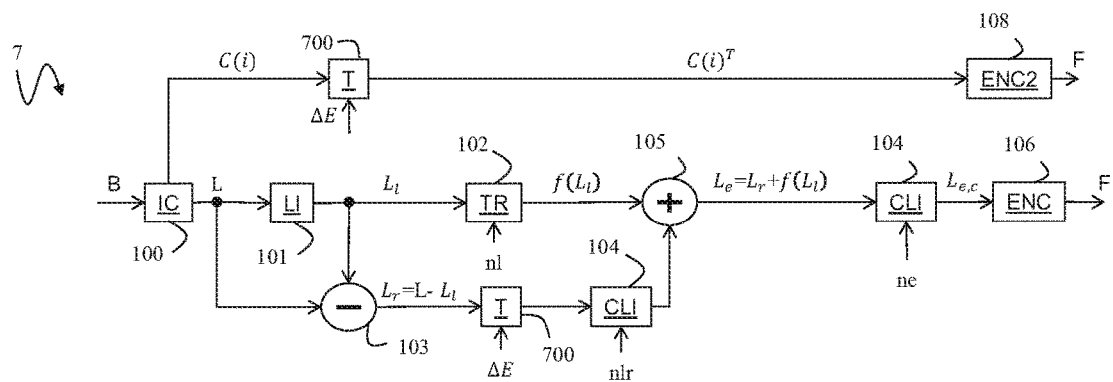
FIG. 7 shows a block diagram of the steps of a variant of the method for FIG. 1.
Figure 10:
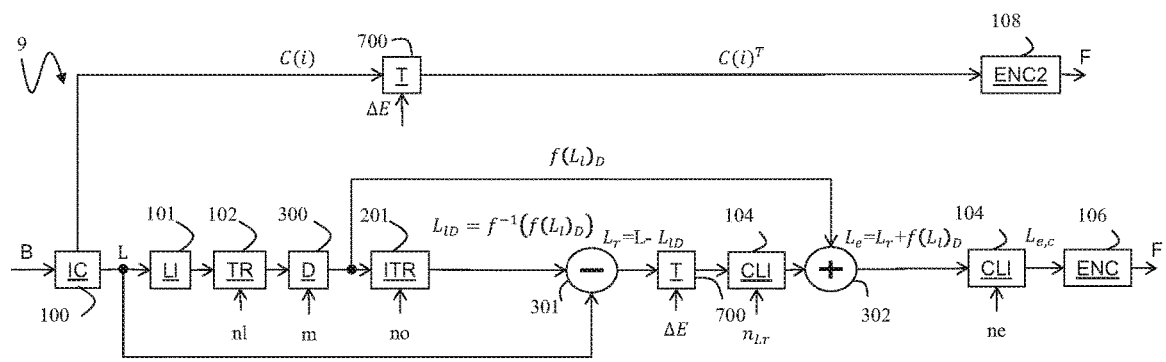
FIG. 10 shows a block diagram of the steps of a variant of the method for FIG. 3.
Figure 12:
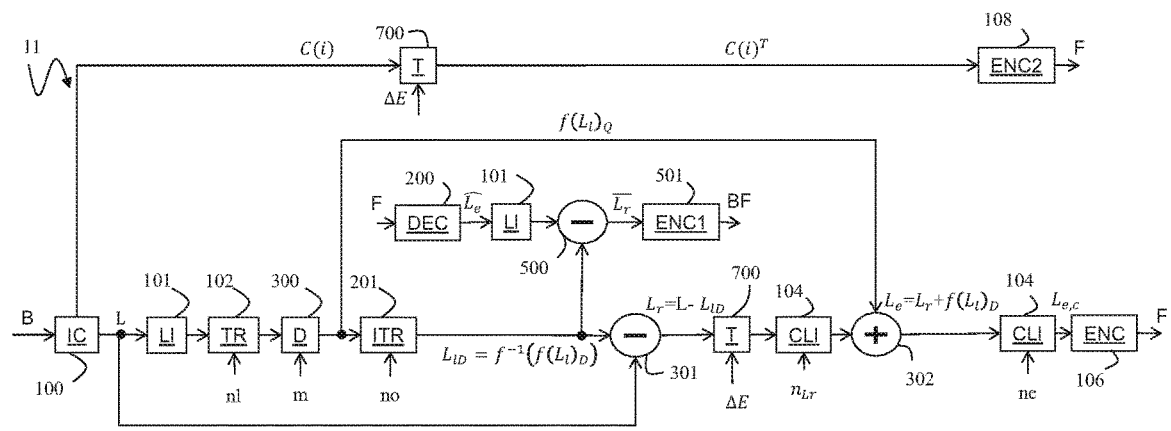
FIG. 12 shows a block diagram of the steps of a variant of the method for FIG. 5.

In FIGS. 7, 10 and 12, a module T transforms (step 700) the luminance residual block $L_r$ and each color component C(i) based on a transform T which depends on the upper bound ΔE of the metric defined in the perceptual space PS, and enabling a control of the visual losses in a displayed decoded version of the picture block B.

Figure 8A:
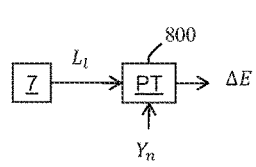
FIGS. 8a-8b show diagrams of the steps of methods of determining an upper bound in accordance with an example of present principles.

FIG. 8a shows a diagram of the steps of an embodiment of a method for determining the upper bound $\Delta E$.

The average value $L_I$ of the luminance component L is obtained from the method described in relation with FIG. 7 and, in step 800, a module PT determines the upper bound $\Delta E$ based on reference lighting conditions $Y_n$ of a display of a decoded version of the encoded picture block B and the average value $L_I$.

Figure 8B:
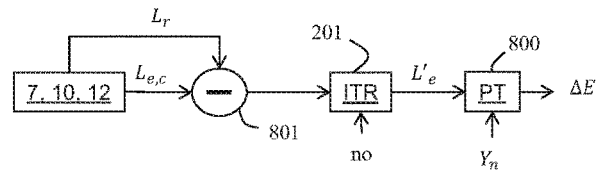

FIG. 8b shows a diagram of the steps of another embodiment of a method for determining the upper bound $\Delta E$.

A version of the luminance block $L_e$ is obtained from the method described in relation with FIG. 7, 10 or 12.

In accordance with an example of present principles, such a version of the luminance block $L_e$ is the output of step 105 in FIG. 7 or of step 302 in FIGS. 10 and 12.

In accordance with an example of present principles, illustrated in FIG. 8b, the clipped version $L_{e,c}$ of the luminance block $L_e$ (output of step 104 in FIGS. 7, 10 and 12) is obtained.

In step 801, a luminance block is obtained by subtracting the luminance residual block $L_r$ from the luminance block $L_e$ or its clipped version $L_{e,c}$. In step 201, the module ITR obtains a representation $L'_e$ of the luminance block by applying the transfer function $f^{-1}$ to the luminance block (output of 801). The version of the luminance block used for determining the upper bound $\Delta E$ is then said representation $L'_e$ of the luminance block.

This embodiment ensures that the upper bound $\Delta E$ is the same on both the encoder and the decoder side when the luminance block is lossless encoded.

The brightness of the version of the luminance block $L_e$ (used for determining the upper bound $\Delta E$) is not constant over the picture block but changes locally. For example, if the version of the luminance block $L_e$ is transformed by assigning a same quantification value to each pixel of the block, the upper bound $\Delta E$ is constant over the block but the transformed values of two picture blocks may be different. Consequently, the upper bound $\Delta E$ changes locally based on the brightness values of the picture block.

The local changes of the upper bound $\Delta E$ are not limited to block-based changes but may extend to any zones defined over the picture block by means of any operator such as a segmentation operator based for example on the brightness values of the picture block.

In accordance with an example of step 800, assuming, during the display of the picture block, a potential increase of the lighting until a maximal environmental brightness value $Y_n$, the upper bound $\Delta E$ is determined from the ratio of the brightness value $Y_Q$ of a version of the luminance block $L_e$ over the maximal environmental brightness value $Y_n$.

In accordance with an example of step 800, when coding degradation over the maximal environmental brightness value is forbidden, the upper bound $\Delta E$ is then given by:

$$\Delta E = \Delta E_{enc} \left(\frac{Y_Q}{Y_n}\right)^{\frac{1}{3}} = \frac{\Delta E_{enc}(L+16)}{116}$$

with $(X_n, Y_n, Z_n)$ being reference lighting conditions of the display of a decoded version of the encoded picture block and $Y_Q$ being a value which represents the brightness of a version of the luminance block $L_e$ and $\Delta E_{enc}$ being a perceptual encoding parameter. Typically, $\Delta E_{enc}$ is chosen to be close to $\Delta E_0$ for visually lossless encoding and greater than $\Delta E_0$ for an encoding with a control of the visual losses in the encoded image.

Thus, using such an upper bound $\Delta E$ allows adapting the encoding to the environmental lighting conditions of a decoded version of the encoded picture block.

Alternatively, the reference lighting conditions of the display of a decoded version of the encoded picture block $(X_n, Y_n, Z_n)$ which have a local character, may be replaced by global reference lighting conditions of the display of a decoded version of the encoded picture block defined by $(X_n', Y_n', Z_n') = (X_n, Y_n, Z_n) Y_Q/Y_n$.

From a coding point of view (color coding), this replacement is equivalent to the choice of the upper bound $\Delta E$ because encoding with a precision equal to $\Delta E$ of a color component a* in the color space LabCIE1976, which is given by $$a^* = 500(f(X/X_n) - f(Y/Y_n)) \approx 500((X/X_n)^{1/3} - (Y/Y_n)^{1/3})$$

is equivalent to encode with a precision equals to $\Delta E_{enc}$ of the color component a*' which is given by $$a^{*'} = 500(f(X/X_n') - f(Y/Y_n')) \approx 500((X/X_n')^{1/3} - (Y/Y_n')^{1/3})$$

The same remark applies to the other component b*. Therefore, instead of changing the perceptual space locally, one just adapts the threshold from $\Delta E_{enc}$ to $\Delta E$.

In accordance with an example of the step 800, to avoid a sub-coding of the parts of the picture block having high brightness values, the upper bound $\Delta E$ is given by $$\Delta E = \Delta E_{enc} \min\left\{\left(\frac{Y_Q}{Y_n}\right)^{1/3}, E_{max}\right\}$$

where an upper-bound is set to $\Delta E_{enc} E_{max}$, typically, $E_{max}$ is set to 1. This last equation means that the brightness of a version of the luminance block $L_e$ is never taken to be greater than the maximal environmental brightness value $Y_n$.

On the other hand, in order to avoid over-coding of the parts of the picture block having very low brightness values, the upper bound $\Delta E$ is then given by:

$$\Delta E = \Delta E_{enc} \max\left\{\left(\frac{Y_Q}{Y_n}\right)^{1/3}, E_{min}\right\}$$

where a lower-bound is set to $\Delta E_{enc} E_{min}$; typically, $E_{min}$ is set to about ⅕. This is due to a contrast masking effect of the dark local brightness of the version of the luminance block $L_e$ by the maximal environmental brightness value $Y_n$.

A combination of both bounds is simply obtained by $$\Delta E = \Delta E_{enc} \min\left\{\max\left\{\left(\frac{Y_Q}{Y_n}\right)^{1/3}, E_{min}\right\}, E_{max}\right\}$$

In accordance with an example of step 700, the transform T is a normalization of each color component by means of the upper bound $\Delta E$.

The transform T is thus a function of the upper bound which changes locally.

In accordance with an example of step 700, the normalization of a color component by means of the upper bound $\Delta E$ is the division of this colour component by a value which is a function of the upper bound $\Delta E$.

Each color component C(i) is then transformed, for example, as follows to obtain a transformed colour component $C(i)^T$:

$$C(i)^T = T(C(i), \Delta E) = \frac{C(i)}{\Delta E^\alpha}$$

with α being a value equal, for example, to 0.5 or 1.

This embodiment is advantageous, in particular to ensure a good transform of the dark zones of the picture block. Actually, dark zones have very low luminance pixel values which may be much lower than 1. Thus, if no normalization by means of the upper bound ΔE is performed, all these pixels will be mapped to 0 before transforming, missing the wanted perceptual transforming precision. The normalization by means of the upper bound ΔE, which is small in such zones, stretches the pixel values allowing a sufficient format precision before quantifying. Also, for very bright pixels, the normalization avoids too large pixel values by dividing the pixel values by the upper bound ΔE which is much bigger than 1 in bright zones.

Thus, the visual losses of each transformed color components depend on the value of the upper bound ΔE. A visually-lossless transform is thus reached when the upper bound ΔE is lower than or equal to the perceptual threshold $\Delta E_0$.

Similarly, each transformed color component $C(i)^T$ is divided by the upper bound $\Delta E_0$ and then the resulting component is transformed in order that the metric of equation (1) stays below 1 to reach a visually-lossless transformation of the color component.

In step 108, each transformed color component $C(i)^T$, output from step 700, is encoded by means of an encoder ENC2 and, potentially, added to the bitstream F.

Figure 9:
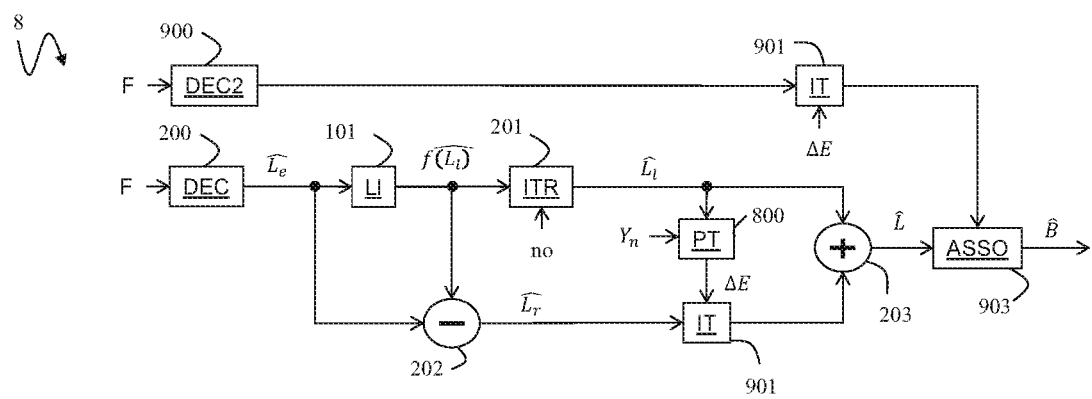
FIG. 9 shows a block diagram of the steps of a variant of the method for FIG. 2.
Figure 13:
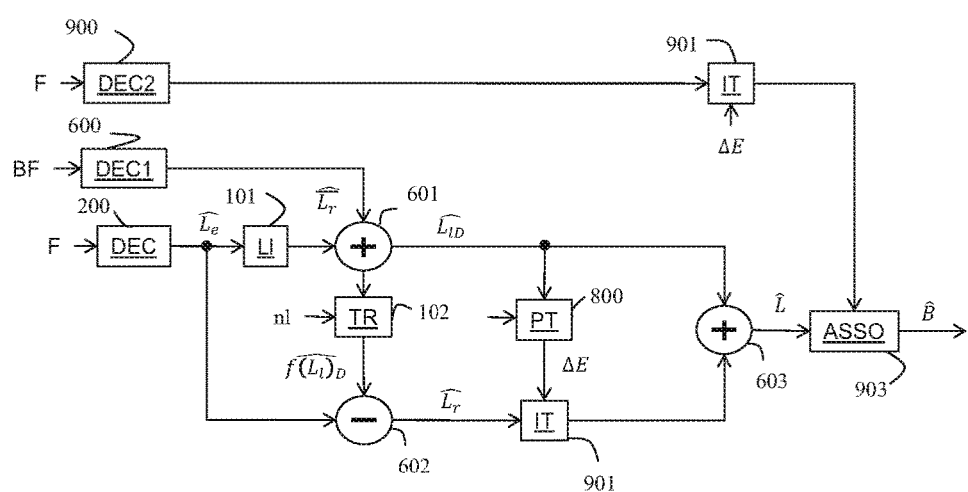
FIG. 13 shows a block diagram of the steps of a variant of the method for FIG. 6.

In step 901 in FIGS. 9, 12 and 13, a module IT transforms the luminance residual block $\widehat{L_r}$ (output of step 202 in FIGS. 9 and 12 and output of step 602 in FIG. 13), by applying an inverse-transform IT. Said inverse-transform IT depends on the perceptual threshold ΔE.

It may be noted that the term "inverse-transform" stands for a transform which has an inverse function compared to the function of the transform T which has been applied during the step 700.

In accordance with an example, when the transform T is a normalization by means of a upper bound ΔE, the transform IT is a re-normalization by means of the upper bound ΔE.

Then, in step 800, the upper bound ΔE is determined, as described above.

Thus, in accordance with an example, the upper bound ΔE is determined according to reference lighting conditions of the display of a decoded version of the encoded picture block and a representation $\widehat{L_l}$ of the average value of the luminance block $\widehat{L_e}$ (output of step 201 in FIGS. 9 and 12 or output of step 601 in FIG. 13).

In accordance with an example of the step 901, the re-normalization is the multiplication by a value which is a function of the upper bound ΔE.

Mathematically speaking, the luminance residual block $\widehat{L_r}$ is inverse-transformed, for example, as follows:

$$\widehat{L_{r,it}} = IT(\widehat{L_r}, \Delta E) = \widehat{L_r} \cdot \Delta E^\alpha$$

with α being a value equals, for example, to 0.5 or 1.

Figure 11:
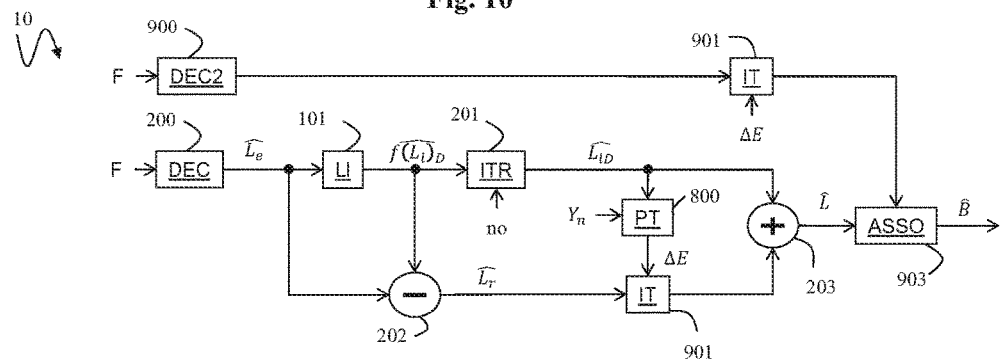
FIG. 11 shows a block diagram of the steps of a variant of the method for FIG. 4.

In step 203 in FIGS. 9 and 11 and in step 603 in FIG. 13, a decoded luminance component $\hat{L}$ of the picture block is obtained by adding together the inverse-transformed luminance residual block $\widehat{L_{r,it}}$ and the representation $\hat{L_l}$ (or $\widehat{L_{lD}}$) of the average value of the luminance block $\widehat{L_e}$.

In step 900 in FIGS. 9, 11 and 13, a decoder DEC2 obtains a decoded version of each color component C(i).

In step 901 in FIGS. 9, 11 and 13, the module IT transforms each decoded color component C(i) by applying the inverse-transform IT.

In step 903 in FIGS. 9, 11 and 13, a module ASSO obtains a decoded picture blocks by associating the decoded luminance component $\hat{L}$ of the picture block with each inverse-transformed colour component C(i).

The decoders DEC, respectively DEC1 and DEC2, are configured to decode data which have been encoded by the encoders ENC, respectively ENC1 and ENC2.

The encoders ENC, ENC1 and/or ENC2 (and decoders DEC, DEC1 and/or DEC2) are not limited to a specific encoder (decoder) but when an entropy encoder (decoder) is required, an entropy encoder such as a Huffmann coder, an arithmetic coder or a context adaptive coder like Cabac used in h264/AVC or HEVC is advantageous.

The encoders ENC and ENC2 (and decoder DEC and DEC2) are not limited to a specific encoder which may be, for example, an image/video coder with loss like JPEG, JPEG2000, MPEG2, h264/AVC or HEVC.

The encoder ENC1 (and decoder DEC1) is not limited to a specific lossless or quasi lossless encoder which may be, for example, an image coder like JPEG lossless, h264/AVC lossless or a trellis based encoder (JPEG-LS: "Information technology—Lossless and near-lossless compression of continuous-tone still images—Baseline", ITU-T Recommendation T.87, June 1998).

On FIG. 1-13, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «, Very Large Scale Integration», or from several integrated electronic components embedded in a device or from a blend of hardware and software components.

Figure 14:
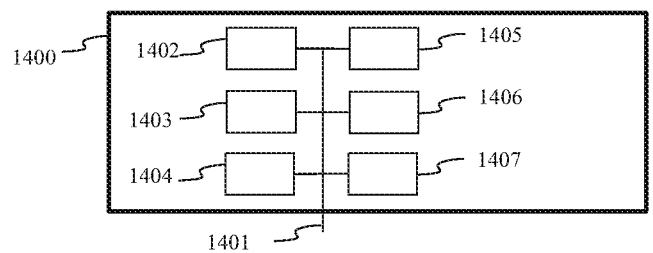
FIG. 14 shows an example of an architecture of a device in accordance with an example of present principles.

FIG. 14 represents an exemplary architecture of a device 1400 which may be configured to implement a method described in relation with FIG. 1-13.

Device 1400 comprises following elements that are linked together by a data and address bus 1401:
- a microprocessor 1402 (or CPU), which is, for example, a DSP (or Digital Signal Processor);
- a ROM (or Read Only Memory) 1403;
- a RAM (or Random Access Memory) 1404;
- a storage interface 1405;
- an I/O interface 1406 for reception of data to transmit, from an application; and
- a battery 1407.

In accordance with an example, the battery 1407 is external to the device. In each of mentioned memory, the word «register» used in the specification can correspond to area of small capacity (some bits) or to very large area (e.g. a whole program or large amount of received or decoded data). ROM 1403 comprises at least a program and parameters. The ROM 1403 may store algorithms and instructions to perform techniques in accordance with present principles. When switched on, the CPU 1402 uploads the program in the RAM and executes the corresponding instructions.

RAM 1404 comprises, in a register, the program executed by the CPU 1402 and uploaded after switch on of the device 1400, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the picture block B is obtained from a source. For example, the source belongs to a set comprising:
- a local memory (1403 or 1404), e.g. a video memory or a RAM (or Random Access Memory), a flash memory, a ROM (or Read Only Memory), a hard disk;
- a storage interface (1405), e.g. an interface with a mass storage, a RAM, a flash memory, a ROM, an optical disc or a magnetic support;
- a communication interface (1406), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with examples of the decoding or decoder(s), the decoded picture block $\hat{B}$ is sent to a destination; specifically, the destination belongs to a set comprising:
- a local memory (1403 or 1404), e.g. a video memory or a RAM, a flash memory, a hard disk;
- a storage interface (1405), e.g. an interface with a mass storage, a RAM, a flash memory, a ROM, an optical disc or a magnetic support;
- a communication interface (1'06), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the bitstream BF and/or F are sent to a destination. As an example, one of bitstream F and BF or both bitstreams F and BF are stored in a local or remote memory, e.g. a video memory (1404) or a RAM (1404), a hard disk (1403). In a variant, one or both bitstreams are sent to a storage interface (1405), e.g. an interface with a mass storage, a flash memory, ROM, an optical disc or a magnetic support and/or transmitted over a communication interface (1406), e.g. an interface to a point to point link, a communication bus, a point to multipoint link or a broadcast network.

In accordance with examples of decoding or decoder, the bitstream BF and/or F is obtained from a source. Exemplarily, the bitstream is read from a local memory, e.g. a video memory (1404), a RAM (1404), a ROM (1403), a flash memory (1403) or a hard disk (1403). In a variant, the bitstream is received from a storage interface (1405), e.g. an interface with a mass storage, a RAM, a ROM, a flash memory, an optical disc or a magnetic support and/or received from a communication interface (1405), e.g. an interface to a point to point link, a bus, a point to multipoint link or a broadcast network.

In accordance with examples, device 1400 being configured to implement an encoding method described in relation with FIG. 1, 3, 5, 7, 10, 12, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 1500 being configured to implement a decoding method described in relation with FIG. 2, 4, 6, 9, 11, 13 belongs to a set comprising:
- a mobile device;
- a communication device;
- a game device;
- a set top box;
- a TV set;
- a tablet (or tablet computer);
- a laptop;
- a display and
- a decoding chip.

Figure 15:
FIG. 15 shows two remote devices communicating over a communication network in accordance with an example of present principles.

In accordance with an example illustrated in FIG. 15, in a transmission context between two remote devices A and B over a communication network NET, the device A comprises means which are configured to implement a method for encoding an picture as described in relation with the FIG. 1, 3, 5, 7, 10, 12, and the device B comprises means which are configured to implement a method for decoding as described in relation with FIG. 2, 4, 6, 9, 11, 13.

In accordance with an example, the network is a broadcast network, adapted to broadcast still pictures or video pictures from device A to decoding devices including the device B.

A signal, intended to be transmitted by the device A, carries the bitstream B and/or BF. The bitstream F comprises an encoded luminance block as explained before. This signal further comprises an information data indicating that the encoded luminance block represents the sum of the luminance component of a picture block and a representation of an average value of said luminance component.

Figure 16:
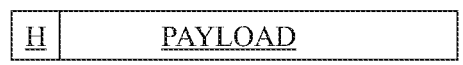
FIG. 16 shows the syntax of a signal in accordance with an example of present principles.

FIG. 16 shows an example of an embodiment of the syntax of such a signal when the data are transmitted over a packet-based transmission protocol. Each transmitted packet P comprises a header H and a payload PAYLOAD. A bit of the header H, for example, is dedicated to represent the information data indicating that the encoded luminance block represents the sum of the luminance component of a picture block and a representation of an average value of said luminance component.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a picture block, said picture block comprising a plurality of pixels, each pixel having a luminance component, wherein the method comprises:
   obtaining a luminance residual block by subtracting a first representation of an average value of the luminance component from the luminance component, said average value of the luminance component being the average of each value of said luminance component of the plurality of pixels of the picture block;
   obtaining a second representation of the average value by applying a transfer function to the average value of the luminance component in order to reduce the dynamic range of the average value;
   encoding a luminance block obtained by adding together the luminance residual block and the second representation of the average value.

2. A method for decoding a picture block, said picture block comprising a plurality of pixels, each pixel having a luminance component expressed in an original number of bits, wherein the method comprises:
   obtaining a luminance residual block by subtracting an average value of a luminance block from said luminance block, said average value of the luminance component being the average of each value of said luminance component of the plurality of pixels of the picture block;
   obtaining a decoded luminance component of the picture block by adding together the luminance residual block and a representation, expressed in the original number of bits, of the average value of the luminance block.

3. A device of encoding a picture block, said picture block comprising a plurality of pixels, each pixel having a luminance component, wherein the device comprises a processor configured to:
   obtain a luminance residual block by subtracting a first representation of an average value of the luminance component from the luminance component, said average value of the luminance component being the average of each value of said luminance component of the plurality of pixels of the picture block;
   obtain a second representation of the average value by applying a transfer function to the average value of the luminance component in order to reduce the dynamic range of the average value;
   encode a luminance block obtained by adding together the luminance residual block and the second representation of the average value.

4. A device of decoding a picture block, said picture block comprising a plurality of pixels, each pixel having a luminance component expressed in an original number of bits, the device comprises a processor configured to:
- obtain a luminance residual block by subtracting an average value of a luminance block from said luminance block, said average value of the luminance component being the average of each value of said luminance component of the plurality of pixels of the picture block;
- obtain a decoded luminance component of the picture block by adding together the luminance residual block and a representation, expressed in the original number of bits, of the average value of the luminance block.

\* \* \* \* \*